United States Patent Office 3,425,742
Patented Feb. 4, 1969

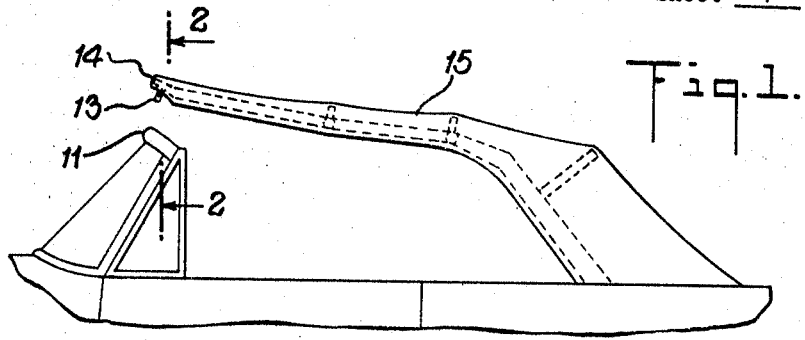
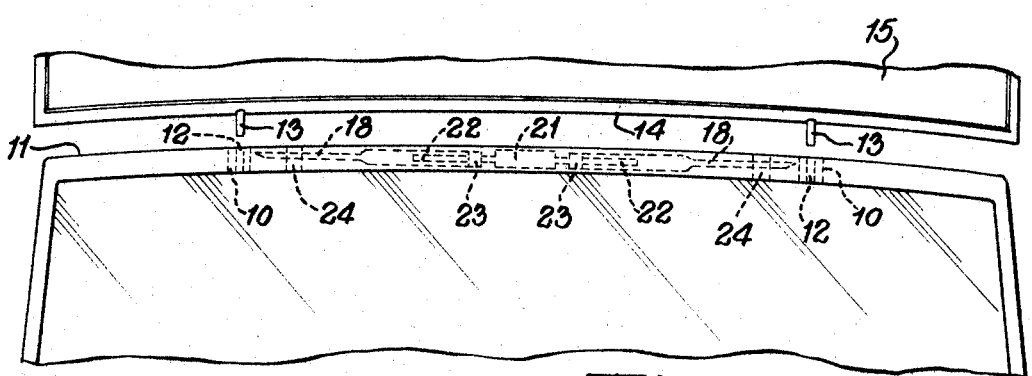
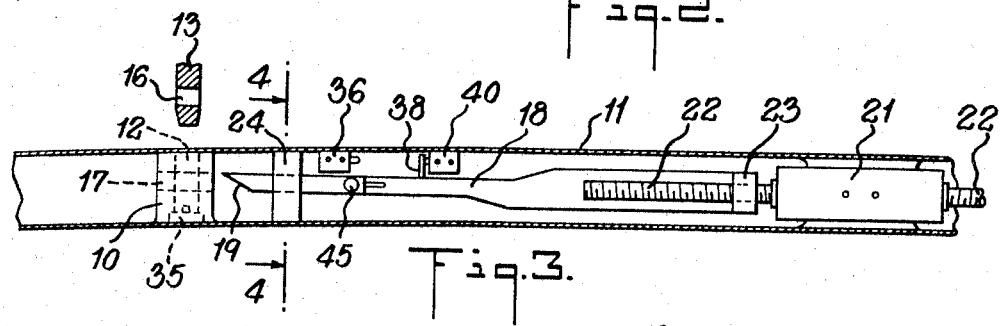
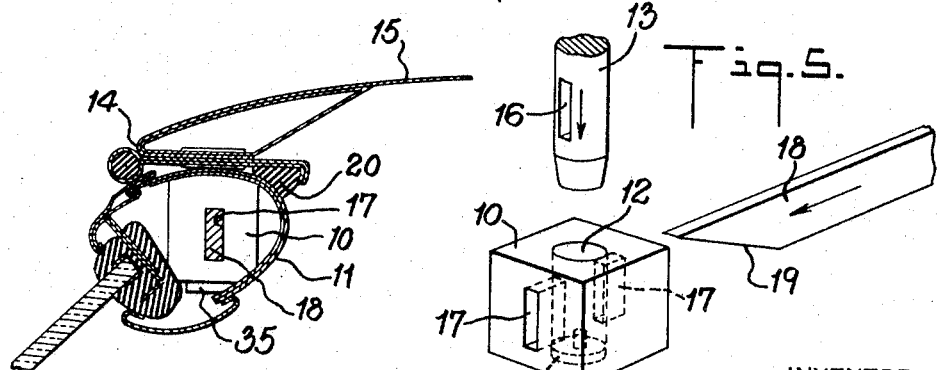

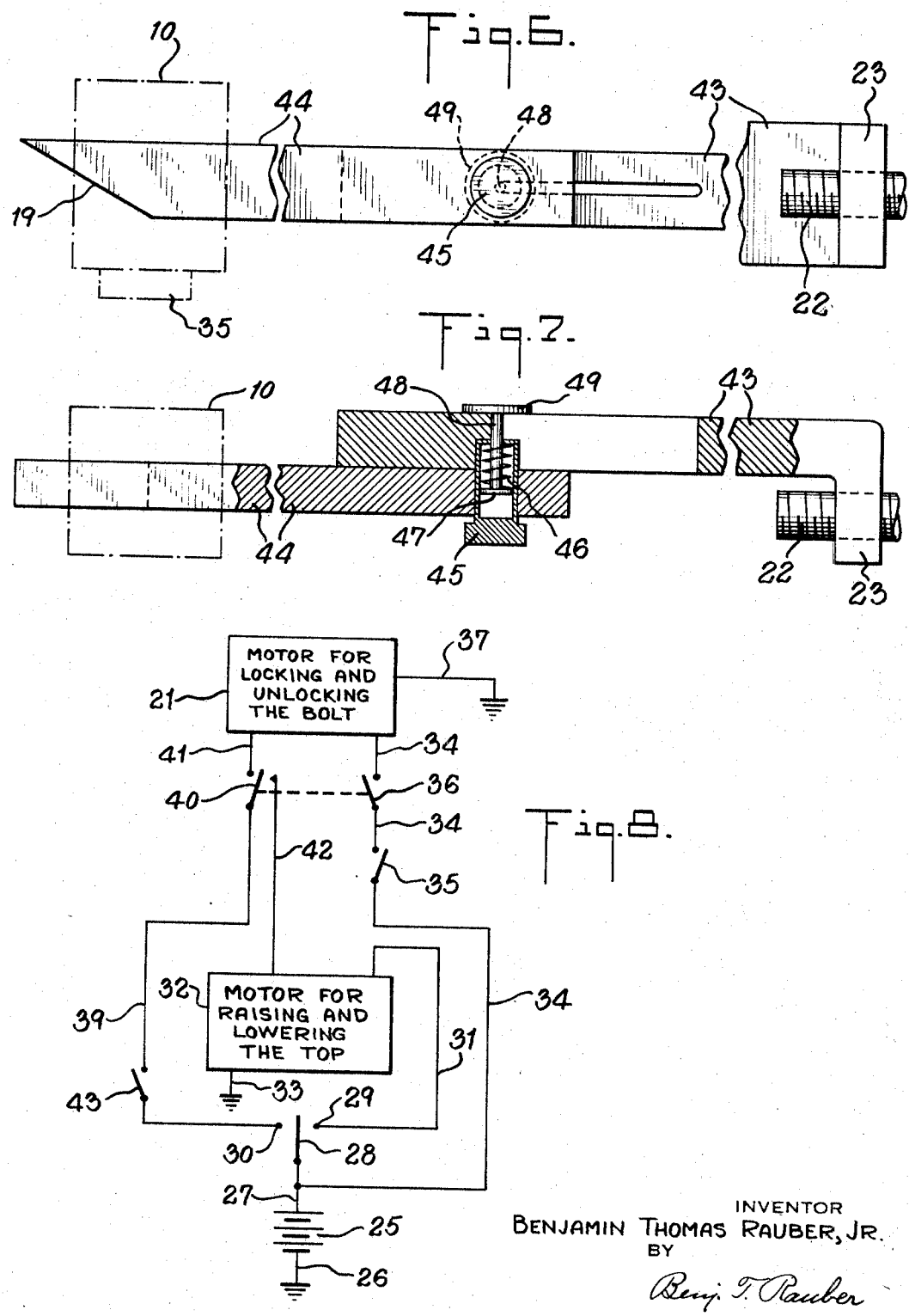

3,425,742
LOCKING MEANS FOR LOCKING THE TOP OF A CONVERTIBLE AUTOMOBILE
Benjamin Thomas Rauber, Jr., 16 W. 16th St., New York, N.Y. 10011
Filed Aug. 8, 1967, Ser. No. 659,213
U.S. Cl. 296—121    7 Claims
Int. Cl. B60j 7/12

ABSTRACT OF THE DISCLOSURE

Locking means for locking the top of a convertible automobile having a transversely slotted pin in the header of the top and a socket in the windshield header having slots to align with the slots of the pin when the pin is down in the slot and a bolt slidable to extend through said slots to lock the pin in the socket. A reversible electric motor is provided to move the bolt and branch circuits controlled by the position of the bolt to move the bolt into and out of locking position.

BACKGROUND OF THE INVENTION

Field of the invention

My invention relates to means for securing the top of a convertible automobile to the windshield header and, the top when the top moves to its "up" position, that is, upwardly and forwardly to a position in which its header is above and rests on the windshield header. The invention also comprises means for releasing the top automatically preparatory to withdrawing the top to its "down" position, that is, when it is withdrawn from its position extending to the windshield to its position back of the tonneau of the automobile.

Prior art

Heretofore, mechanical securing means have been provided, such as toggles, levers, hooks, etc., for securing the top header to the windshield header, some of which operated from the outside of the automobile and some from within. Some means have been operable automatically, as, for example, by electric systems. But these prior means were cumbersome and bulky and for this reason, or other structural reasons, it was necessary to mount them in the top header where they were subject to jarring and the electric wiring to bending with each raising and lowering of the top.

Summary of the invention

In my invention I provide on the lower side of the top header one or more, and preferably two, pins spaced transversely to the length of the vehicle and extending downwardly to be received in sockets provided in the windshield header. When the top is moved to "top" position the pins come down into the sockets in the windshield header thereby centering the top header on the windshield header. Preferably each socket is formed of a block of material secured in the windshield header and having a vertical hole to receive one of the pins depending from the top header.

Each pin is provided with a transverse slot through the portion that enters the socket and each block containing the socket is provided with corresponding slots so positioned that when the pin approaches a position in which the top header rests on the windshield header the transverse slot in the pin approaches alignment with the transverse slots in the block.

A locking bolt is provided for each pin and socket assembly and is mounted to slide through the slots of its pin and socket assembly to lock the pin in the socket and thus secure the top and windshield headers in locked position when the top is up and to be withdrawn to release the top preparatory to lowering it. The locking bolts have a tapered forward end so that if, when each bolt enters the slot in the pin, the pin is not completely in its locking position, the bolt will wedge the pin downwardly thus ensuring a tight closing of the top header onto the windshield header. The windshield header and/or the top header are generally provided with a resilient strip of rubber or other resilient material for the purpose of a fluid-tight seal between the headers. The wedging action of the bolt presses the headers into a tight engagement with this strip.

The locking mechanism may be hand operated but the invention comprises an automatic electrically controlled system in which the locking and unlocking of the top is done automatically in timed sequence with the mechanism for moving the top from down to up position and reversely. In this system there are a reversible top-operating motor for operating a mechanism for raising the top to "up" position and reversely for lowering the top and also a reversible bolt-moving motor in the windshield header for moving the bolt through the slot in the pin when the pin is in position to receive the beveled end of the bolt, the top being in its fully "up" position and reversely for withdrawing the bolt preparatory to moving the top to "down" position. Motor driven top operating mechanisms are known in the art and are, therefore, not illustrated in this specification. The mechanism for moving the locking bolt comprises a spindle driven by the motor as, for example, an extension of the motor axle, and having threads engaging threads on a nut formed on, or secured, to the bolt. When two bolts are provided each end of the motor shaft may be extended and the nut and spindle on one side of the motor is threaded in an opposite direction from that on the other side.

The electrical system for controlling the sequence of moving the bolt to and from locking position comprises two branches: one for controlling the movement of the bolt to locking position and then stopping it, and the other for withdrawing the bolt from locking position and stopping it, whereupon the top operating motor is started in reverse to lower the top. The source of electric power is the battery of the automobile and the power source is connected to one or the other branch by a manually operable switch. When the switch is turned to connect the battery to the top operating motor, the motor is moved directly to raise the top whereupon the bolt operating motor is started by a switch actuated as the pins of the top header enter the sockets in the windshield header and is stopped by a limit switch which breaks the circuit when the bolt is in full locking position.

When the manually operable switch is turned to connect the battery to the second branch the bolt-operating motor is connected to rotate in reverse until the bolt is completely withdrawn whereupon a limit switch is opened to stop this motor and to start the top operating motor in reverse to lower the stop.

BRIEF DESCRIPTION OF DRAWING

The various features of my invention are illustrated in the accompanying drawings in which:

FIG. 1 is a side view of a part of a convertible automobile to which my invention is applied;

FIG. 2 is a view on the plane 2—2 of FIG. 1 of the upper part of the windshield and windshield header of a convertible embodying my invention and of the forward part of a top and top header cooperating therewith;

FIG. 3 is an elevation of a portion of the windshield header and part of the bolt and socket and the motor and locking mechanism;

FIG. 4 is a section on line 4—4 of FIG. 3 through the windshield header illustrating the relation of the locking bolt and a socket block for receiving the top header pin;

FIG. 5 is a perspective view of the socket block the top header pin and the bolt in the positions as the pin is about to enter the socket;

FIG. 6 is a front view of a modification of the bolt and actuating assembly in which the bolt may be detached from the motor spindle for manual operation;

FIG. 7 is a section on a horizontal plane of the modification shown in FIG. 6, and FIG. 8 is a wiring diagram of the electrical system for operating the locking mechanism and controlling the locking motor and the top operating motor.

DETAILED DESCRIPTION OF PREFERRED EMBODIMENT

Referring to FIGS. 1 to 7 of the drawings the locking mechanism of my invention comprises a pair of blocks 10 mounted in spaced relation within a windshield header 11 each having a vertical socket 12 to receive a corresponding pin 13 depending from the header 14 of a top 15. The pin 13 has a transverse passage 16 lengthwise of the header 11.

The block 10 has a passage 17 which is in substantial alignment with the passage 16 of the pin when the pin is locked in position to hold the top header in tight engagement with the windshield header. Each pin is locked in one of the blocks 10 by means of a bolt 18 which at the end is tapered upwardly as shown at 19 in FIGS. 3 and 5 so that if the lower edge of the slot 16 of the pin 13 is only slightly below the upper edge of the slot 17 of the block 10, the tip of the bolt may enter the slot 16 and as it proceeds farther into the slots will wedge the pin downwardly and bring the top header into an air-tight engagement with the windshield header. The top header customarily has a resilient engagement with the windshield header as, for example, the strip 20 of rubber shown in FIG. 4. Accordingly a precision fit of the bolt 18 in the slot 17 is not required. The resilience of the rubber strip provides a pressure contact between the two headers and between the upper surfaces of the bolt 18 and the slot 17.

Two locking bolts may be actuated by a single reversible motor 21 as shown in FIG. 3. In this arrangement the motor 21 is mounted centrally in the windshield header and has its axle extended at each end in screw-threaded spindles 22, the threads of one spindle being reverse to the threads of the other. Each of the reversed bolts 18 has fixed thereon an offset flange 23 having a threaded opening to receive and engage the threads of the respective threaded spindle and are held from turning by their engagement in their respective guide blocks 24 fixed in the header and having a slot through which the bolt extends. The bolts are thereby moved lengthwise in one direction when the motor rotates the spindles in one direction and in the opposite direction when the motor rotates the spindles reversely. The rotation of the motor forwardly wiring diagram of FIG. 8.

This system is energized by a battery 25 one terminal of which is grounded to the body of the vehicle, which serves as a common ground of the system, through a conductor 26 and the terminal of which is connected by a conductor 27 to a manually operable switch 28 which may swing from a mid-position, as indicated in FIG. 8 in which it is not connected to any system either to the right to make contact with a terminal 29 of a branch circuit at the right or to a terminal 30 of a branch circuit at the left. When the switch 28 contacts the terminal 29 current passes through conductor 31 to a reversible motor 32 and thence through a conductor 33 to ground, energizing the motor forwardly to actuate the top raising mechanism to lift the top to its "up" position.

When the top reaches its "up" position, the circuit from the battery 25 to the motor 32 is broken by releasing switch 28 from the terminal 29.

To actuate the motor 21 for locking the top according to my invention, a branch circuit 34 comprising control switches 35 and 36 is provided.

The switch 35 is positioned as shown in FIGS. 3 and 5 to be actuated to closed position by the pin 13 as the latter moves downwardly sufficiently to bring the lower edge of the slot 16 below the upper edge of the slot 17 so that the beveled forward end 19 of the bolt may enter the gap between these edges and on further forward movement wedge the pin downwardly. The switch 36 is normally closed and therefore when the switch 35 is closed the circuit to the reversible lock actuating motor 21 is closed, the motor being grounded by a conductor 37. The switch 36 is fixed to the windshield header as shown in FIG. 3 in position to be opened by a stud 38 when the bolt reaches its fully closed position thereby breaking the circuit to the motor 21. When the bolt 18 and pin 13 return to their original positions the switches 35 and 36 return to their original positions.

Before the top may be lowered the locking bolts must first be returned to unlocking position and then an electric circuit established through the reversing circuit of the motor 32. This is accomplished in the left branch of the wiring diagram of FIG. 8.

When the switch arm 28 is moved to contact the terminal 30 a circuit is established through a conductor 39 and a switch 40, which is positioned as shown in FIG. 3 to be closed by the stud 38 when the locking bolts are in locked position, and a conductor 41 to the reversing terminal of the motor 21. The motor 21 thereupon rotates to withdraw the locking bolts to unlocking positions thereby releasing the pin 13 to permit the top to be lowered. The switch 40 is so positioned, as shown in FIG. 3 as to be engaged by the stud 38, when the bolts have reached their fully withdrawn positions and the pin 13 is free, and moved to open the circuit to the conductor 41 and motor 21, stopping the motor, and to close a circuit from the conductor 39 to a conductor 42 leading to the reverse terminal of the motor 32 which actuates the lowering mechanism to lowered position.

When the top is lowered to its "down" position the circuit from the battery through the conductors 39 and 42 to the motor 32 is broken, by releasing the switch on the dash panel. In the present arrangement, however, the circuit is opened by a switch 43 suitably positioned behind the tonneau of the car to be opened by the top in its "down" position.

Normally the locking mechanism is controlled and operated by the electric system described above. In the event of a failure or malfunctioning of the electric system or of the battery or other source of electric energy, means are provided, as shown in FIGS. 6 and 7, to disconnect the locking bolts from the motor 21 and operate them manually. For this purpose each bolt 18 is made of two parts, 43 and 44, the part 43 having the threaded engagement with the spindle 22 and the part 44 having the beveled end 19. These two parts are normally connected by a hollow plug 45 slidable in a transverse bore in the part 44 and spring-pressed into a recess in the part 43 by a spring 46 confined between the inner end of the plug 45 and the head 47 of a pin 48 having a base plate 49 bearing against the adjacent side of the part 43. Normally the spring keeps the plug 45 projecting into the recess in the part 43 and through the bore in the part 44, thereby keeping these parts rigidly united and capable of being operated by the electric equipment described above. When it is desired to operate the locking system manually the plug 45 is drawn outwardly clear of the recess in the part 43 and retain it therein.

Access to the plug 45 may be had through an opening in the windshield header normally closed by a cover plate hinged or otherwise secured to move to closed and open positions.

Having desribed my invention, I claim:

1. Locking means for locking the top header of a convertible automobile in its up position to a windshield header which comprises at least one block in the windshield header having a vertical socket and a slot transverse to said socket, at least one pin in said top header positioned to descend into said socket when said top header descends to said windshield header and having a transverse slot to align with the transverse slot in said block when said pin is in said socket, a locking bolt mounted in said windshield header to slide into said transverse slots of said pin and block to lock said headers together and means to move each of said locking bolts into and out of locking positions.

2. The locking means of claim 1 in which each locking bolt has the end entering into said slots beveled upwardly to wedge said pin downwardly into locking position in said socket.

3. The locking means of claim 1 in which said means to move each of said locking bolts into and out of locking position comprises a reversible electric motor.

4. The locking means of claim 3 comprising an electric supply circuit and two branch circuits, a first one supplying current to said locking motor to drive said motor to move said locking bolts to locking position and comprising in series a switch to close said circuit when said pin is lowered sufficiently to bring the lower edge of its transverse slot below the upper edge of the transverse slot of said block and a switch to open said circuit when said locking bolt is in locking position, and a second branch of said circuit supply current to said electric motor to drive it in reverse and a switch in said second circuit to open said circuit when said bolt is withdrawn from locking position and a manually operable switch to connect said branch circuits alternatively to said supply circuit.

5. The means of claim 4 comprising a branch from said first circuit to a top operating reversible electric motor operating means for raising said top to up position, a branch from said second branch to said top operating reversible electric motor in reverse for lowering said top and a switch between said second branch and said branch leading therefrom connecting said branches when said locking bolt is withdrawn from locking position.

6. The locking means of claim 3 in which said reversible electric motor comprises a threaded spindle for each locking bolt and in which each said lock bolt has a first part having threads engaging the threads of said spindle and held from rotating with said spindle thereby to be moved lengthwise by the rotation of said spindle and having a lengthwise extending slot and a bore intersecting said slot, a second part overlapping said slot, and having a bore which may be aligned with the bore of said first part, a hollow plug slidable in the bore of said second part and into the bore of said first part and a double headed pin extending through said slot into said hollow plug, one head of said pin being within said plug and the other bearing against a face of said first part and a spring confined between said head within said plug and a wall of said plug to bias said plug into the bore of said first part and to permit withdrawal of said plug and sliding of said second part relative to said first part into and out of locking position.

7. The locking means of claim 3 in which said locking bar is composed of one part driven by said reversible electric motor and a second part movable into and out of said slots of said block and said pin and means to connect said two parts and to disconnect them to permit said second part to move independently of said first part into and out of locking position.

References Cited

UNITED STATES PATENTS 2,753,202  7/1956  Smith _____ 292—144
3,158,217  11/1964  Johnson _____ 292—144

LEO FRIAGLIA, *Primary Examiner.*

ROBERT R. SONG, *Assistant Examiner.*

U.S. Cl. X.R.

292—144